United States Patent [19]
Hofmann et al.

[11] Patent Number: 5,605,126
[45] Date of Patent: Feb. 25, 1997

[54] PISTON FOR INTERNAL COMBUSTION ENGINES, ESPECIALLY DIESEL ENGINES

[75] Inventors: Lothar Hofmann, Neumarkt/Opf.; Rudolf Schwarz; Andreas Deuber, both of Nürnberg; Karl-Heinz Obermeier-Wagner, Fürth/Bay., all of Germany

[73] Assignee: Alcan Deutschland GmbH, Gottingen, Germany

[21] Appl. No.: 596,013

[22] Filed: Feb. 6, 1996

[51] Int. Cl.$^6$ ........................................ F02F 3/26
[52] U.S. Cl. ........................................... 123/276
[58] Field of Search ................... 123/276, 260, 123/302, 661, 262, 261, 257, 269, 279, 256; 92/208, 222

[56] References Cited

U.S. PATENT DOCUMENTS

| | | | |
|---|---|---|---|
| 4,739,738 | 4/1988 | Sander et al. | 123/276 |
| 4,831,918 | 5/1989 | Milke et al. | 92/222 |
| 4,889,557 | 12/1989 | Iwata et al. | 123/276 |
| 5,115,774 | 5/1992 | Nomura et al. | 123/276 |
| 5,115,776 | 5/1992 | Ohno et al. | 123/399 |
| 5,119,777 | 6/1992 | Mielke et al. | 123/193.6 |
| 5,158,055 | 10/1992 | Oh et al. | 123/276 |
| 5,209,200 | 5/1993 | Ahern et al. | 123/276 |
| 5,299,490 | 4/1994 | Harrer et al. | 92/208 |
| 5,351,665 | 10/1994 | Kapus et al. | 123/276 |

FOREIGN PATENT DOCUMENTS

| | | | |
|---|---|---|---|
| 4746 | 6/1953 | Germany | 123/276 |
| 3648 | 6/1953 | Germany | 123/276 |
| 2607624 | 9/1977 | Germany | 123/276 |
| 3119113 | 3/1984 | Germany | 123/276 |
| 1687830 | 10/1991 | U.S.S.R. | 123/276 |
| 1135964 | 6/1986 | WIPO | 123/276 |

OTHER PUBLICATIONS

Patents Abstracts of Japan, Internal Combustion Engine, N–533 Nov. 11, 1986, vol. 10/No. 331.

*Primary Examiner*—Raymond A. Nelli
*Attorney, Agent, or Firm*—Watson Cole Stevens Davis, P.L.L.C.

[57] ABSTRACT

A piston for diesel engines is made of a toughness-increasing aluminium alloy containing copper, nickel, silicon, magnesium, iron and manganese. The use of this material, which can conventionally be chill-cast, and by implying special dimensions, provides a piston which, despite its relatively light construction, provides the utmost security against cracking in the stressed regions, e.g. the piston boss or the combustion chamber recess.

8 Claims, 2 Drawing Sheets

PISTON FOR INTERNAL COMBUSTION ENGINES, ESPECIALLY DIESEL ENGINES

The present invention relates to a piston, especially for high-speed direct injection diesel engines.

Such pistons have a relatively low compression height and therefore reach very high boss temperatures of over 200° C. The temperatures at the edge of the combustion chamber recess provided in the piston reach a level of over 300° C. Further, as ignition pressures in the range of more than 13 MPa prevail in the engine of the above-mentioned type, this leads very often in the case of aluminium pistons to cracks in the boss region and in the edge region of the combustion chamber recess. Additionally, the flanks of the piston ring grooves are subject to a particularly large amount of wear at high temperatures.

Various solutions have been suggested up to now in the state of the art in order to avoid the problems described above. Thus, for example, DE-OS 26 07 624 describes a light-weight piston in which bearing bushes with high toughness and elasticity are pressed into the bores of the piston boss and a gap is provided between the inner edge of the piston bosses and the opposing outer edge of the bearing bush in this region. In a similar manner, DE-OS 36 39 806 describes a lightweight piston in which inserts have been integrally cast above the horizontal plane embracing the piston direction.

Further, a lightweight piston for diesel engines is known from German patent DE 31 19 113 in which the edge of the combustion chamber recess is strengthened by means of an insert part which consists of a copper alloy and is covered with a chemically or galvanically deposited iron layer. The greatly stressed recess edge area is to be reinforced in this manner.

A fiber reinforcement or fiber strengthening for combustion chamber recesses of highly stressed pistons is known from DE-OS 34 44 406. Finally, DE-OS 40 10 474 describes a light-weight piston with a reinforcement for ring grooves.

However, the above-mentioned suggestions in the state of the art in every case involve a very work-intensive and therefore expensive production of the piston and, as a rule, an increase in the piston weight.

A further possibility generally known in the state of the art to avoid the above-described problems in highly loaded pistons is a dimensioning of the piston which appropriately takes the stressing of the piston into account. However, this solution leads in highly stressed pistons to correspondingly large wall thicknesses which in turn involves the already revealed disadvantages of a high piston weight and a correspondingly expensive production.

It was also already suggested in the state of the art to produce pistons from heat-resistant aluminium alloys by means of squeeze casting. The finely grained and tougher structure arising on account of such a production process brought a certain improvement, but such pistons are too work-intensive and expensive on account of the complicated production process.

An assembled system with a piston head consisting of steel and a lower piston part consisting of aluminium is known from WO 90/04711. A compression height of $KH \equiv 0.55 \times D$ is provided in this piston.

Additionally, a single metal light-weight piston for Otto engines is known from WO 92-05355. In this, the compression height KH, the recess depth MT and the inner boss spacing AA have the following values: $KH=(0.27-0.35) \times D$, $MT=(0.03-0.08) \times D$ and $AA=(0.08-0.20) \times D$.

It is the problem (object) of the present invention to provide a highly loadable piston for internal combustion engines which has a low weight, is simple and cheap to produce and additionally resists high thermal and mechanical stresses.

This object is solved by the features of claim 1.

On account of the inventive dimensions of the piston, this has, compared to commonly known pistons, a lighter construction, the loadability being at least the same compared with the state of the art without a reinforcement of highly stressed locations by means of cast-in parts, the insertion of bushes or surface coatings improving the strength being necessary.

Advantageous embodiments of the invention are characterized by the dependent claims.

As a result of the suggested advantageous aluminium alloy with toughness increasing alloy constituents such as copper and nickel, a piston capable of being subjected to an extreme load is provided which additionally has low friction wear because a very heat-resistant matrix of a high proportion of primary silicon is present in this alloy. This composition of the alloy would lead the expert world on the basis of prevailing knowledge to expect that an alloy of this type is difficult to cast and therefore lead to faulty pistons with correspondingly unsatisfactory properties. However, it has surprisingly been shown that the suggested material is not only extremely heat-resistant but, contrary to expectations, it can also be easily cast, i.e. the alloy can be processed by means of a simple casting process without, for example, squeeze casting being necessary.

Particular advantages result from a piston according to claim 1, 2 or 3 which is produced from the alloy suggested according to claim 4. This is because a highly loadable piston is provided which resists the extremely strong loads in the engine despite its relatively "filigrane" piston structure. Such a piston is easy and cheap to produce and has excellent toughness values, in particular also at high temperatures.

The present invention is described in an exemplary manner in the following on the basis of an advantageous embodiment with reference to the enclosed drawings, in which.

Figure 1:
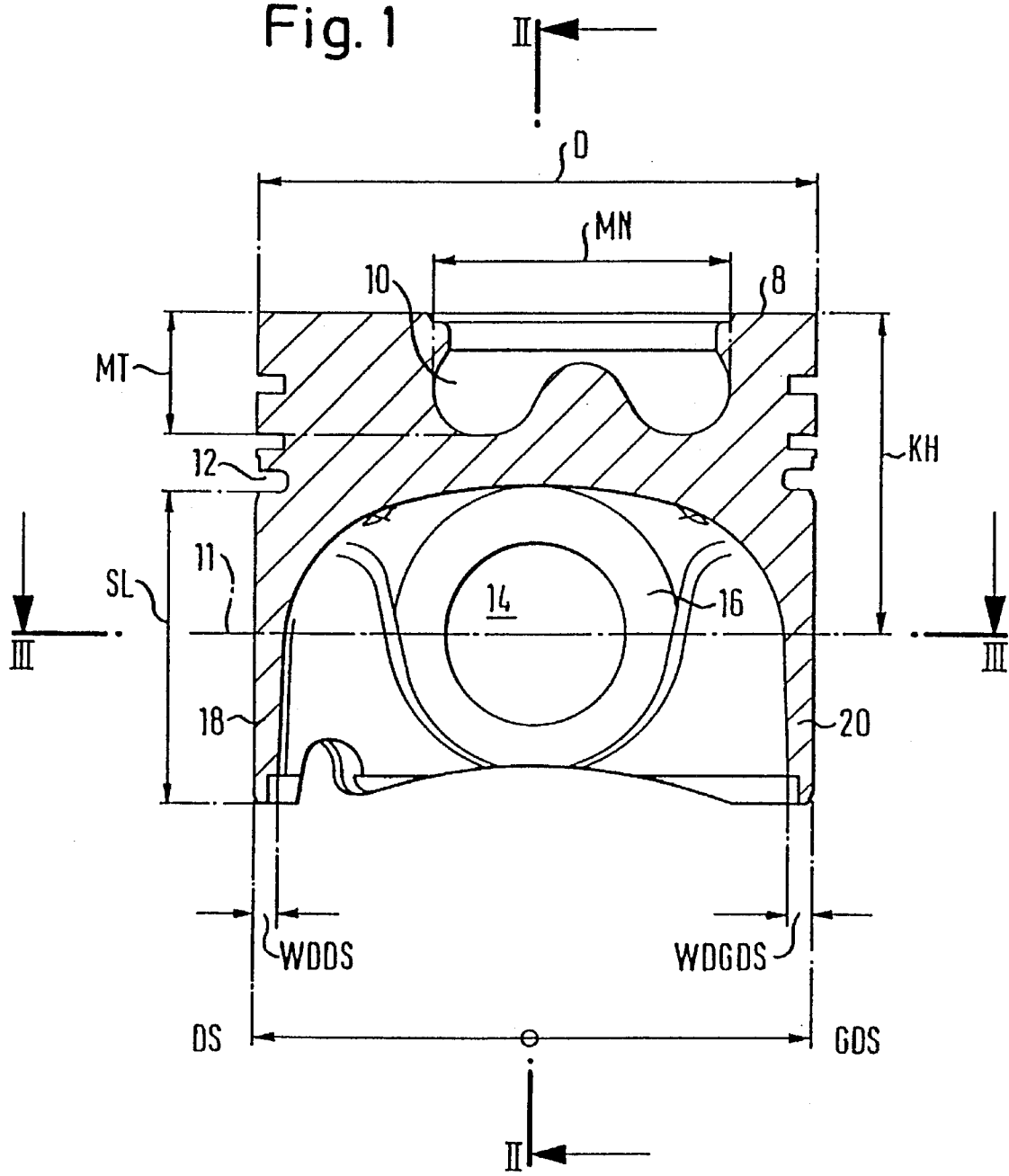
FIG. 1 shows a cross section in the connecting rod pivoting plane through a piston according to the invention.

FIG. 1 shows a piston according to the invention which has a combustion chamber recess 10 in the piston top 8. The following is to be understood with respect to the dimensions indicated in FIG. 1: D denotes the piston diameter, KH denotes the compression height, i.e. the distance between the piston top 8 and the piston pin axis 11. The compression chamber recess 10 has a diameter MN and a depth MT. The length of the piston shaft beneath a lowest piston ring groove 12 is denoted with SL. Finally, the thicknesses of the body wall 18 on the thrust side DS and of the body wall 20 on the counter-thrust side GDS are denoted by WDDS (thrust side) and WDGDS (counter-thrust side).

Figure 2:
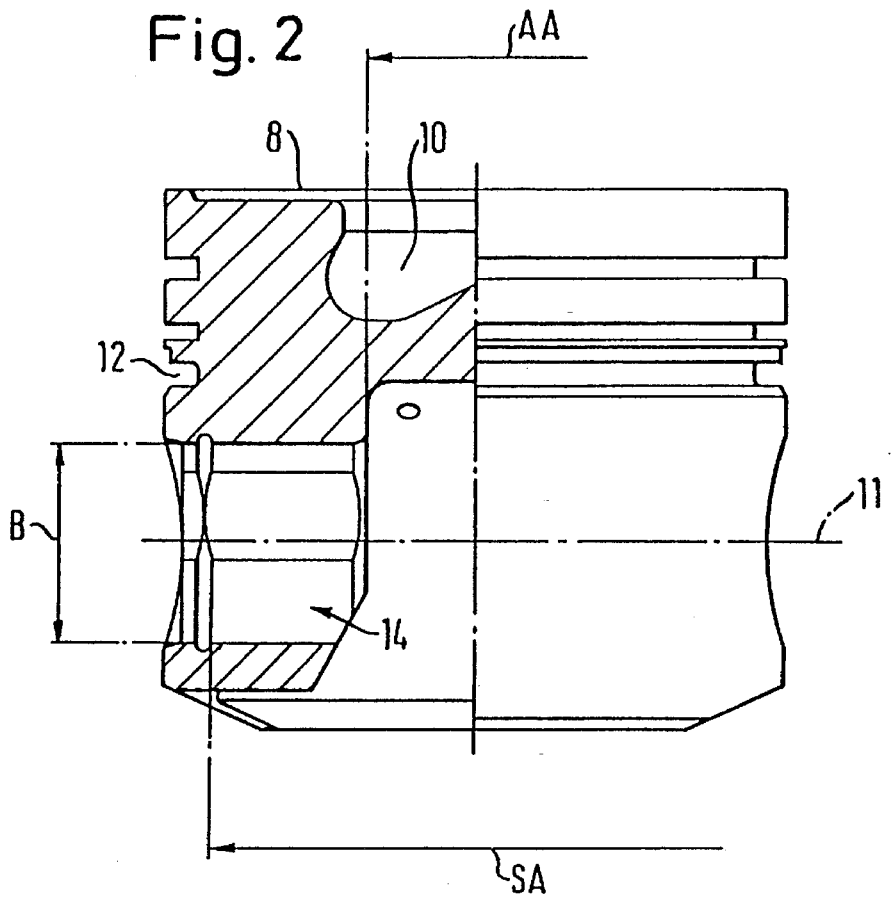
FIG. 2 shows a partial section along the line II—II in FIG. 1.

The reference sign B in FIG. 2 denotes the diameter B of a pin bore 14, SA being the dimension for the piston pin length. Finally, the radially inner spacing of the piston pin bosses 16 (compare FIG. 1) are indicated with AA.

Figure 3:
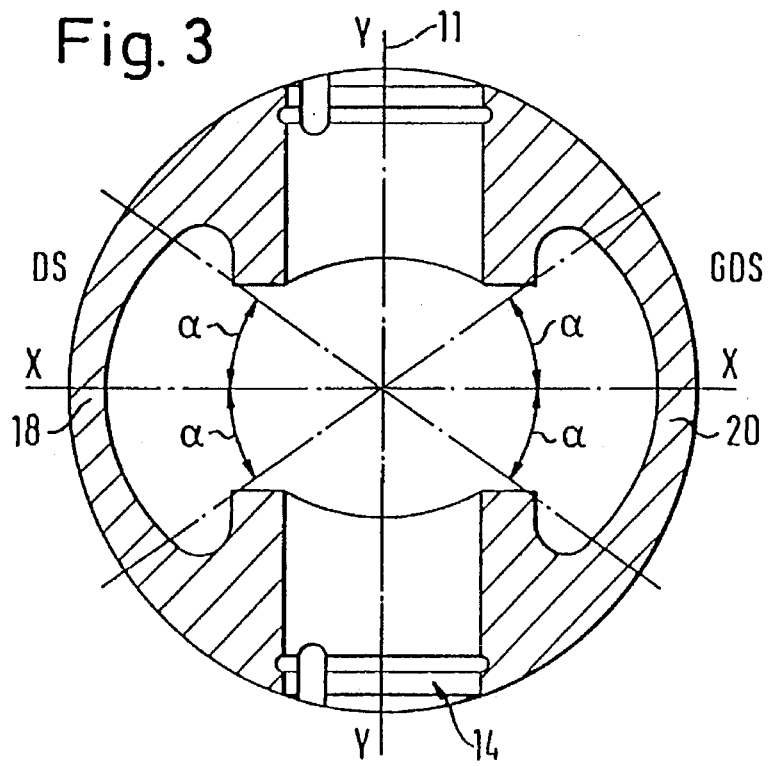
FIG. 3 shows a cross section of the piston in FIG. 1 along the line III—III in FIG. 1.

The connecting rod pivoting plane is denoted with X and the piston pin plane with Y in FIG. 3. An angular area α extends between the connecting rod pivoting plane X and the piston pin plane Y. In this area α, the thickness of the body wall 18 on the thrust side DS and the thickness of the body wall 20 on the counter-thrust side GDS vary. The body wall thicknesses respectively taper along the course in the direction from the piston pin plane Y to the connecting rod pivoting plane X.

The measurements of a piston according to the invention are listed in the following, the basic measurement rules as well as the measurements of a preferred exemplary embodiment being respectively indicated:

| | Denotation | Measurement ranges | Exemplary embodiment |
|---|---|---|---|
| Piston diameter | D | as required | 81 mm |
| Compression height | KH | 0.48 to 0.63 D | 0.56 D |
| Depth of the combustion chamber recess | MT | 0.16 to 0.35 D | 0.21 D |
| Diameter of the compression chamber recess | MN | 0.4 to 0.62 D | 0.54 D |
| radially inner distance of the piston pin bosses above the piston pin axis | AA | 0.24 to 0.43 D | 0.27 D |
| Diameter of the pin bore | B | 0.29 to 0.41 D | 0.32 D |
| Length of the piston pin | SA | 0.7 to 0.86 D | 0.83 D |
| Length of the piston body beneath the lower most piston ring groove | SL | 0.25 to 0.45 D | 0.32 D |
| Body wall thickness of the piston on the thrust side at X | WDDS (X) | 0.030 to 0.065 D | 0.052 D |
| Body wall thickness of the piston at the counter-thrust side at X | WDGDS (X) | 0.023 to 0.047 D | 0.027 D |

The body wall thickness decreases continuously at the thrust side (DS) in the angular area α from Y in the direction of X with the relationship from (0.09 to 0.06)×D to (0.065 to 0.030)×D. At the counter-thrust side (GDS), the body wall tapers continuously in the angular area α from Y in the direction of X with the relationship of (0.09 to 0.06)×D to (0.047 to 0.023)×D.

The advantageous alloy will be described in the following.

The particularly heat-resistant alloy according to an advantageous further embodiment of the invention consists of the elements copper, nickel, silicon, magnesium, iron, manganese, aluminium and residual impurities (for example, zinc, tin, titanium, calcium amongst others. The proportions of the individual elements in the alloy are indicated in the following table, the values for a preferred embodiment also being indicated for the elements copper, nickel, silicon and magnesium:

| Copper | Cu 2 to 6 wt. % | preferably 3.3 to 4.0 wt. % |
|---|---|---|
| nickel | Ni 2 to 6 wt. % | preferably 2.2 to 3.0 wt. % |
| silicon | Si 11 to 16 wt. % | preferably 11.0 to 12.0 wt. % |
| magnesium | Mg 0.5 to 2.0 wt. % | preferably 0.8 to 1.3 wt. % |
| iron | Fe < 0.7 wt. % | |
| manganese | Mn < 0.5 wt. % | |
| sum of the impurities | <0.15 wt. % | |
| the rest is aluminium | | |

As it has surprisingly been shown, when using the above-mentioned alloy, a piston with the measurements mentioned above can be produced in an extremely advantageous manner in a normal chill-casting process which can be carried out without great technical effort in contrast, for example, to the squeeze casting process.

Furthermore, this alloy has increased toughness values in comparison to commonly known piston alloys. By using this alloy, the above-described piston can be produced in an advantageous manner as a highly stressable piston even though this has a relatively light construction. The properties of the inventive alloy are shown in the following table, in which the values of the hot yield limit, the hot tensile strength and the hot failure load at 250° C. with one of the most useful commonly known eutectic piston alloys, Nüral 3210 (GalSi12CuNiMg), in two processing states are compared:

| Alloy | Yield limit (0.2 elongation limit) $R_{p0.2}[N/mm^2]$ at 250° C.* | Tensile strength $R_m[N/mm^2]$ at 250° C.* | Failure load A5 [%] at 250° C.* |
|---|---|---|---|
| Nüral 3210 (fully heat-treated) (G-AlSi12CuNiMg) | 80–110 | 100–150 | 3.0–5.0 |
| Nüral 3210 (partially heat-treated) (G-AlSi12CuNiMg) | 90–110 | 130–150 | 1.0–2.0 |
| Alloy according to the invention (partially heat-treated) | 110–180 | 150–220 | 0.5–1.5 |

*Testing respectively after a holding time of 10 min. at the testing temperature.

We claim:

1. A piston for internal combustion engines, especially diesel engines, including a piston diameter D, a compression height KH, a combustion chamber recess (10) with a diameter MN and a depth MT, a pin bore (14) with a diameter B, a radially inner spacing AA of the piston pin bosses above the piston pin axis, a piston pin length SA, a length SL of the piston body beneath the lowermost piston ring groove (12), a body wall thickness WDDS(X) on the thrust side in the connecting rod pivoting plane X, a body wall thickness WDGDS(X) on the counter-pressure side in the connecting rod pivoting plane X, the body wall thicknesses WDDS(X) and WDGDS(X) continuously decreasing in an angular area α between the connecting rod pivoting plane X and the piston pin plane Y from Y in the direction of X, and the mentioned dimensions lying within the following ranges:

KH=(0.48 to 0.63)×D
MT=(0.16 to 0.35)×D
MN=(0.40 to 0.62)×D
B=(0.29 to 0.41)=D
AA=(0.24 to 0.43)×D

SA=(0.70 to 0.86)×D
SL=(0.25 to 0.45)×D
WDDS (X)=(0.030 to 0.065)×D
WDGDS (X)=(0.023 to 0.047)×D, and the body wall thicknesses in the angular area α decreasing from the piston pin plane Y in the direction of the connecting rod pivoting plane X according to the following dimension rules:
  from (0.09 to 0.06)×D to (0.065 to 0.030)×D on the thrust side, and
  from (0.09 to 0.06)×D to (0.047 to 0.023)×D on the counter-thrust side.

2. A piston according to claim 1, in which the angular area α is smaller or equal to 10°.

3. A piston according to claim 1, in which the piston has the following dimensions:
  D=81 mm
  KH=0.56 D
  MT=0.21 D
  MN=0.54 D
  B=0.32 D
  AA=0.27 D
  SA=0.83 D
  SL=0.32 D
  WDDS(X)=0.052 D
  WDGDS(X)=0.027 D.

4. A piston according to claim 1 which is produced from an alloy consisting in percentages by weight of:
  2% to 6% copper
  2% to 6% nickel
  11 to 16% silicon
  0.5 to 2.0% magnesium
  less than 0.7% iron
  less than 0.5% manganese
  the sum of the impurities is less than 0.15%
  the rest is aluminium
and preferably
  3.3 to 4.0% copper
  2.2 to 3.0% nickel
  11.0 to 12.0% silicon
  0.8 to 1.3% magnesium.

5. A piston according to claim 4, which is produced according to the chill-casting process.

6. A piston according to claim 2 in which the piston has the following dimensions:
  D=81 mm
  KH=0.56 D
  MT=0.21 D
  MN=0.54 D
  B=0.32 D
  AA=0.27 D
  SA=0.83 D
  SL=0.32 D
  WDDS (X)=0.052 D
  WDGDS (X)=0.027 D.

7. A piston according to claim 2 which is produced from an alloy consisting in percentages by weight of:
  2% to 6% copper
  2% to 6% nickel
  11 to 16% silicon
  0.5 to 2.0% magnesium
  less than 0.7% iron
  less than 0.5% manganese
  the sum of the impurities is less than 0.15%
  the rest is aluminum
and preferably
  3.3 to 4.0% copper
  2.2 to 3.0% nickel
  11.0 to 12.0% silicon
  0.8 to 1.3% magnesium.

8. A piston according to claim 3 which is produced from an alloy consisting in percentages by weight of:
  2% to 6% copper
  2% to 6% nickel
  11 to 16% silicon
  0.5 to 2.0% magnesium
  less than 0.7% iron
  less than 0.5% manganese
  the sum of the impurities is less than 0.15%
  the rest is aluminum
and preferably
  3.3 to 4.0% copper
  2.2 to 3.0% nickel
  11.0 to 12.0% silicon
  0.8 to 1.3% magnesium.

* * * * *